United States Patent
Rhoades et al.

(10) Patent No.: US 10,162,808 B2
(45) Date of Patent: Dec. 25, 2018

(54) ANNOTATION CREATION SYSTEM AND METHOD

(71) Applicant: SIEMENS PRODUCT LIFECYCLE MANAGEMENT SOFTWARE INC., Plano, TX (US)

(72) Inventors: Daren Rhoades, Laguna Hills, CA (US); Kenneth A. Hosch, Redondo Beach, CA (US); Thomas James Buchanan, Vizcaya (ES)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 290 days.

(21) Appl. No.: 14/707,651

(22) Filed: May 8, 2015

(65) Prior Publication Data

US 2016/0328373 A1 Nov. 10, 2016

(51) Int. Cl.
*G06F 3/00* (2006.01)
*G06F 17/24* (2006.01)
*G06F 3/0484* (2013.01)
*G06F 3/0488* (2013.01)
*G06F 9/451* (2018.01)
*G06F 3/048* (2013.01)

(52) U.S. Cl.
CPC ............ *G06F 17/241* (2013.01); *G06F 3/048* (2013.01); *G06F 3/0488* (2013.01); *G06F 3/04842* (2013.01); *G06F 9/453* (2018.02)

(58) Field of Classification Search
CPC .. G06F 17/5086; G06F 17/50; G06F 2217/02; G06F 17/5004; G06F 17/241; G06F 17/30929
See application file for complete search history.

(56) References Cited

U.S. PATENT DOCUMENTS

| | | |
|---|---|---|
| 2002/0018068 A1 | 2/2002 | Baumann |
| 2006/0173657 A1 | 8/2006 | Haws et al. |
| 2007/0234198 A1* | 10/2007 | Tien ............ G06F 17/241 715/205 |
| 2010/0201684 A1* | 8/2010 | Yadav ............ G06F 17/50 345/420 |
| 2012/0120052 A1 | 5/2012 | Gong et al. |
| 2014/0306956 A1 | 10/2014 | Yadav et al. |

OTHER PUBLICATIONS

International Searching Authority, PCT International Search Report and Written Opinion for PCT/US2016/031099, dated Jul. 5, 2016.

* cited by examiner

*Primary Examiner* — Kyle R Stork

(57) ABSTRACT

A system having a processor is provided that facilitates drawing and annotation of objects on a touch screen. The processor is responsive to an object selection input corresponding to a selection of an object displayed at an object location, to display a preview type of an annotation for the selected object at an annotation location adjacent to the object location. Also, the processor stops displaying the annotation when an object deselection input is received that corresponds to a deselection of the object prior to the annotation being changed to a persistent type. Further, when the first object is selected, the processor is responsive to an annotation selection input corresponding to a selection of the annotation, to cause the annotation to change from being the preview type to being the persistent type that remains visually displayed when the object is deselected after the annotation has changed to the persistent type.

20 Claims, 6 Drawing Sheets

ANNOTATION CREATION SYSTEM AND METHOD

TECHNICAL FIELD

The present disclosure is directed, in general, to computer-aided design, visualization, and manufacturing systems, product data management (PDM) systems, product lifecycle management ("PLM") systems, and similar systems, that are used to create and manage data for products and other items (collectively referred to herein as product systems).

BACKGROUND

Computer-aided design (CAD) systems and other types of drawing systems may include a graphical user interface (GUI) through which drawings of products may be created. Such graphical user interfaces may benefit from improvements.

SUMMARY

Variously disclosed embodiments include systems and methods that may be used to draw objects in a CAD system or other type of drawing system. In one example, a system may comprise at least one processor in operative connection with an input device and a display device. The at least one processor may be configured to be responsive to an object selection input through the input device corresponding to a selection of a first object displayed at a first object location on a visual workspace through the display device, to cause the display device to display a preview type of a first annotation for the selected first object at a first annotation location on the visual workspace adjacent to the first object location. Also, the at least one processor may be configured to cause the display device to stop displaying the first annotation on the workspace when an object deselection input is received through the input device that corresponds to a deselection of the first object prior to the first annotation being changed to a persistent type. In addition, when the first object is selected, the at least one processor may be configured to be responsive to an annotation selection input through the input device corresponding to a selection of the first annotation, to cause the first annotation to change from being the preview type to being the persistent type that remains visually displayed at the first annotation location on the workspace when the first object is deselected via the object deselection input after the first annotation has changed to the persistent type.

In another example, a method may include various acts carried out through operation of at least one processor. Such a method may include through operation of the at least one processor responsive to an object selection input through an input device corresponding to a selection of a first object displayed at a first object location on a visual workspace through a display device, causing the display device to display a preview type of a first annotation for the selected first object at a first annotation location on the visual workspace adjacent to the first object location, which preview type of the first annotation is visually removed from the workspace when an object deselection input is received through the input device that corresponds to a deselection of the first object prior to the first annotation being changed to a persistent type. The method may also include through operation of the at least one processor responsive to an annotation selection input through the input device corresponding to a selection of the first annotation, causing the first annotation to change from being the preview type to being the persistent type that remains visually displayed at the first annotation location on the workspace when the first object is deselected via the object deselection input after the first annotation has changed to the persistent type.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design).

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
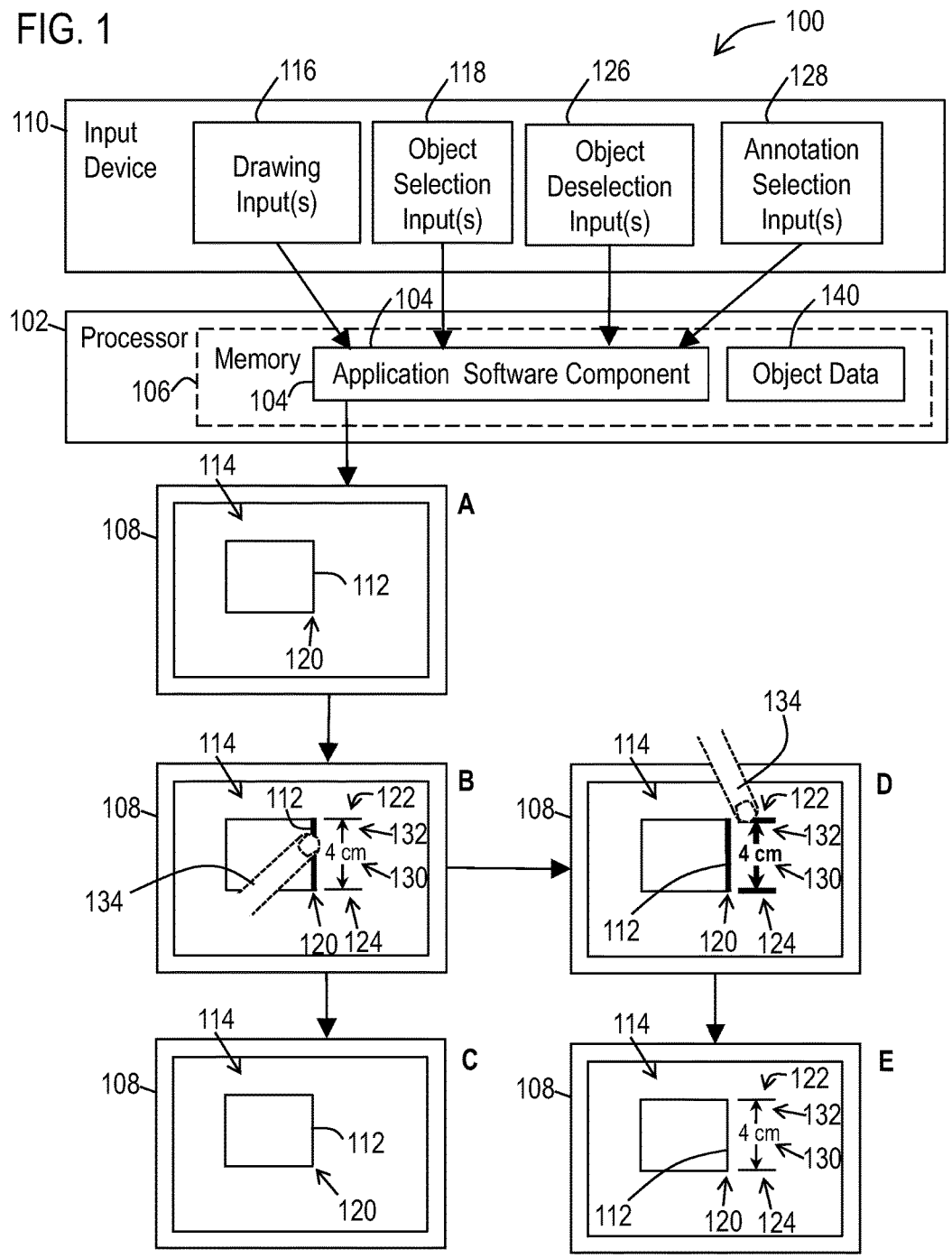
FIG. 1 illustrates a functional block diagram of an example system that facilitates annotation of drawing objects.

Various technologies that pertain to drawing systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

Many forms of drawing systems (such as CAD systems) are operative to manipulate various types of visual objects. Such visual objects may include geometric primitives such as straight line segments, arcs, curves, and splines. Such visual objects may also include 2-D and 3-D shapes such as circles, squares, rectangles, spheres, cones, cylinders, cubes, and cuboids. Such visual objects may also include combinations of simpler visual objects to form complex 2-D or 3-D structures. Thus in general, a drawing object may correspond to any type of graphical object that can be displayed through a display device (such as a display screen) that is capable of being visually manipulated via inputs through an input device with respect to shape, size, orientation, and/or position.

With reference to FIG. 1, an example system 100 that facilitates drawing and annotation of objects is illustrated. The system 100 may include at least one processor 102 that is configured to execute one or more application software components 104 from a memory 106 in order to carry out the various features and acts described herein. The application software component 104 may include a drawing software application or a portion thereof such as a CAD software application. Such a CAD software application may be operative to produce a CAD drawing based at least in part on inputs provided by a user.

An example of CAD/CAM/CAE software that may be adapted to include at least some of the functionality described herein includes the NX suite of applications that is available from Siemens Product Lifecycle Management Software Inc. (Plano, Tex.). However, it should also be understood that such a drawing software application may correspond to other types of drawing software, including vector based illustration software, presentation software, diagramming software, word processing applications, visual programming tools, and/or any other type of software that involves drawing and manipulation of objects.

The described system may include at least one display device 108 (such as a display screen) and at least one input device 110. For example, the processor 102 may be integrated into a housing that includes a touch screen that serves as both an input and display device. Examples of such systems may include mobile phones, tablets, and notebook computers. However, it should be appreciated that example embodiments may use other types of input and display devices. For example, systems may include display devices with display screens that do not include touch screens, such as an LCD monitor or a projector. Further, systems may use other types of input devices to provide inputs for manipulating objects such as a mouse, pointer, touch pad, drawing tablet, track ball, joystick, keypad, keyboard, camera, motion sensing device, or any other type of input device capable of providing the inputs described herein.

Further it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device for example may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a processor of the server.

FIG. 1 schematically illustrates a plurality of different views (A-E) of the display device 108 that are caused to be displayed by the processor 102 in response to various inputs received through the input device 110. For example in view A of the display device 108, the processor 102 may be configured to cause the display device 108 to draw one or more visual objects (such as first object 112) on a workspace 114 responsive to drawing inputs 116 received through the input device 110. Such a workspace 114 may correspond to a two-dimensional background surface on which objects are drawn, displayed, and manipulated in a graphical user interface of the application software component 104. However, it should also be appreciated that for 3-D drawings, the workspace may correspond to a two dimensional view of a three dimensional space in which objects are visually drawn, displayed, and manipulated using the graphical user interface of the application software component 104. Also in other examples, 3-D displays may be used to render 3-D drawings in a 3-D workspace.

Also, as shown in view B of the display device, the processor 102 may be configured to be responsive to an object selection input 118 through the input device 110 corresponding to a selection of the first object 112 displayed at a first object location 120 on the visual workspace 114 through the display device 108, to cause the display device to display a preview type of at least one annotation 122 (i.e., a first annotation) for the selected first object at a first annotation location 124 on the visual workspace adjacent to the first object location 120. Such an object selection input 118 for example, may correspond to a user touching a touch screen on the first object location 120 with a finger 134 (or a stylus or other type of input/input device).

In this example, the first object 112 may correspond to a geometric primitive such as a line (or other type of primitive such as an arc, ellipse or spline). Such an object may be connected to other lines to form more complex geometric shapes (e.g., such as the rectangle shown in FIG. 1). In the example shown in FIG. 1, only the first object 112 is selected. However, it should be appreciated that the application software component may enable additional objects to be selected as well at the same time, in order to generate applicable preview type annotations for the combination of selected objects.

In an example embodiment, a preview type of an annotation corresponds to an annotation that is selectable but is not a persistent part of the workspace until some particular action is taken by a user to make it persistent. Thus as shown in view C of the display device, while the first annotation is of the preview type, the processor 102 may be configured to cause the display device 108 to stop displaying the first annotation 122 on the workspace 114 when an object deselection input 126 is received through the input device 110 that causes a deselection of the first object prior to the first annotation being changed to a persistent type.

To avoid the annotation from being removed in this manner, the preview type of annotation may be selected by a user to change it to a persistent type. For example, as shown in view D of the display device (when the first object is selected), the processor may be configured to be responsive to an annotation selection input 128 through the input device corresponding to a selection of the first annotation 122, to cause the first annotation to change from being the preview type to being the persistent type. Such an annotation selection input 128 for example, may correspond to a user touching the touch screen on the first annotation location 124 with a finger 134 (or a stylus or other type of input/input device).

After becoming the persistent type, as shown in view E, the processor may be configured to cause such a persistent type of the first annotation to remain visually displayed 124 at the first annotation location 124 on the workspace when the first object 112 is deselected via the object deselection input 126 after the first annotation has changed to the persistent type.

In an example embodiment, the displaying of a preview type may correspond to the default behavior of the application software component 104 when an object is selected. In other words, the application software component may display such preview type annotations when an object is selected without the user first having to activate an annotation command that toggles on the display of such preview type annotations when an object is selected. However, it should be appreciated that in alternative embodiments, the application software component 104 may include functionality that enables preview type annotations to be turned off or on. For example, such alternative examples may require an annotation command to be provided by a user input (e.g., via an annotation graphical user interface button) in order to activate or deactivate the display of preview type annotations when one or more objects are selected.

As used herein an annotation corresponds to a dimensional measurement, a note, a comment, an explanation, and/or any other type of visual indicia that conveys metadata and/or other information associated with and/or relevant to the selected object. In the examples shown in FIG. 1, the annotation 122 visually illustrates a measurement for one of the dimensions of the object (such as a height of the object). For a CAD software application, the annotation may indicate a numeric measurement 130 (such as "4 cm") that represents the height of the object in some unit of measurement based on the specified scale for the drawing. In addition, the annotation 122 may include dimension lines 132. For example, a length measurement annotation may include two dimension lines with arrowheads and tick lines that illustrate the location of opposed ends of the portions of the object that corresponds to the numeral measurement being displayed by the annotation.

In other examples, such dimension measurement annotations may display a width or thickness measurement of a portion of the object, the degrees for an angle between different portions of an object, a radius or diameter of a circular object, a degree of curvature of a curved portion (e.g., edge/bend) of an object, and/or any other measurement data related to a drawn object. In other examples, the annotation may display the tolerances associated with the measurement (e.g., "±0.05 mm")

In addition, annotation data may display other data associated with an object such as the material that the object may be made of (e.g., "PVC", "Steel"), the name of the object (e.g., "base plate", "hole", "flange"), and a name for the orientation of the part (e.g., "isometric view").

In example embodiments, the processor may be configured to determine what information to include in an annotation based on characteristics of the object (or multiple objects) that are selected, as well as previously stored object data 140 (e.g., metadata) associated with the drawing and/or the selected object(s) thereof. For example, the processor may calculate the length of a selected object based on the width of the drawn object shown in the workspace 114 as well as a predetermined scale (e.g., 10:1) associated with the actual dimensions of a real world part relative to the size of the part depicted in the workspace 114.

In example embodiments, the processor may be operative to store and update the object data 140 stored in the memory 106 or other location based on features of the objects being drawn and other inputs provided by the user (such as the name of an object, the material of an object, notes and/or other information). The processor may be configured to generate the visual information displayed for such object data based on the type of information stored in the object data. For example, for numeric measurement dimensions, the processor may be configured to display annotation indicia adjacent the object that includes dimension lines and a numeric measurement such as that illustrated in FIG. 1. However, for a name, note, comment, material description, or other alphanumeric textual data, the processor may be configured to display annotation indicia that includes the textual data adjacent the object and an arrow that points to the object (or selected portion thereof).

As discussed previously, the described selection inputs 118, 128 may correspond to a touch screen input generated by a user pressing a finger or stylus on the position of the object or annotation being displayed on a touch screen. For input devices such as a mouse, such selection inputs may correspond to a user clicking a mouse pointer on the position of the object/annotation.

Also, the described deselection input 126 may correspond to a user selecting the workspace, the object a second time, and/or a third object. Such a deselection input may also correspond to some other action taken by the user, such as selecting a new drawing tool to draw a different type of object or some other action with the user interface of the application software component that causes the first object to be deselected. Also, it should be appreciated that the application software component may be configured to be responsive to any type of input from any type of input device (e.g., touch screen, mouse, tablet, keyboard, trackball, gamepad, microphone) to provide the described selection and deselection inputs.

In example embodiments, the processor may be configured (e.g., via the application software component 104) to update the annotation dynamically responsive to changes made to the object associated with the annotation. For example, the processor may be configured to store in a memory an association between the first object and the first annotation responsive to the annotation selection input 128 (that selected the annotation and made it a persistent type of annotation). Based on this association, the processor may be configured to automatically update the first annotation to display modified information corresponding to changes to the first object being displayed on the workspace made in response to at least one further input through the input device.

Such a further input for example could change the length of an object. Thus is response to this change, the application software component may calculate a new length for the object and update the persistent type annotation 124 to be properly align the dimensions lines with the new size of the object and to include a revised numerical dimension measurement corresponding the new calculated length of the object.

As discussed previously, the visual appearance of the preview annotation(s) may be based on characteristics of the one or more selected objects determined by the application software component 104. Such characteristics may include the type and/or shape of the selected object. Such characteristics may also include the orientation and/or other relationships between two selected objects.

Figure 2:
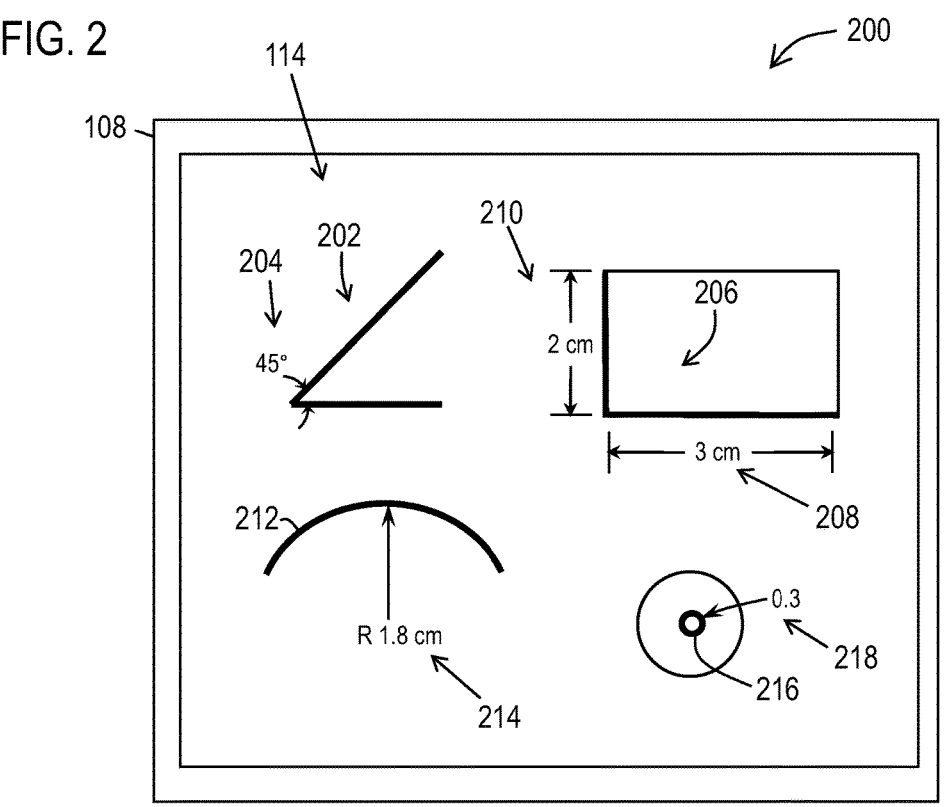
FIGS. 2-4 illustrate examples of annotations generated for drawing objects.

Thus, as illustrated in the example workspace view 200 in FIG. 2, for two selected objects 202 connected at a 45° angle (or other angle) the processor may be configured to generate a preview type angular annotation 204 indicating the degrees of an angle/corner of the connected objects 202. Also, for selected objects 206, the processor may be configured to generate multiple preview annotation(s) 208, 210 to visually display a length dimension measurement such as a width dimension measurement, a height dimension measurement, or any combination thereof. In addition, for a selected arc type of object 212, the processor may be configured to generate a preview type annotation that visually displays a radius dimension measurement 214. Also for a circle type of object 216, the processor may be configured to generate a preview type annotation that visually displays a diameter measurement 218.

Figure 3:
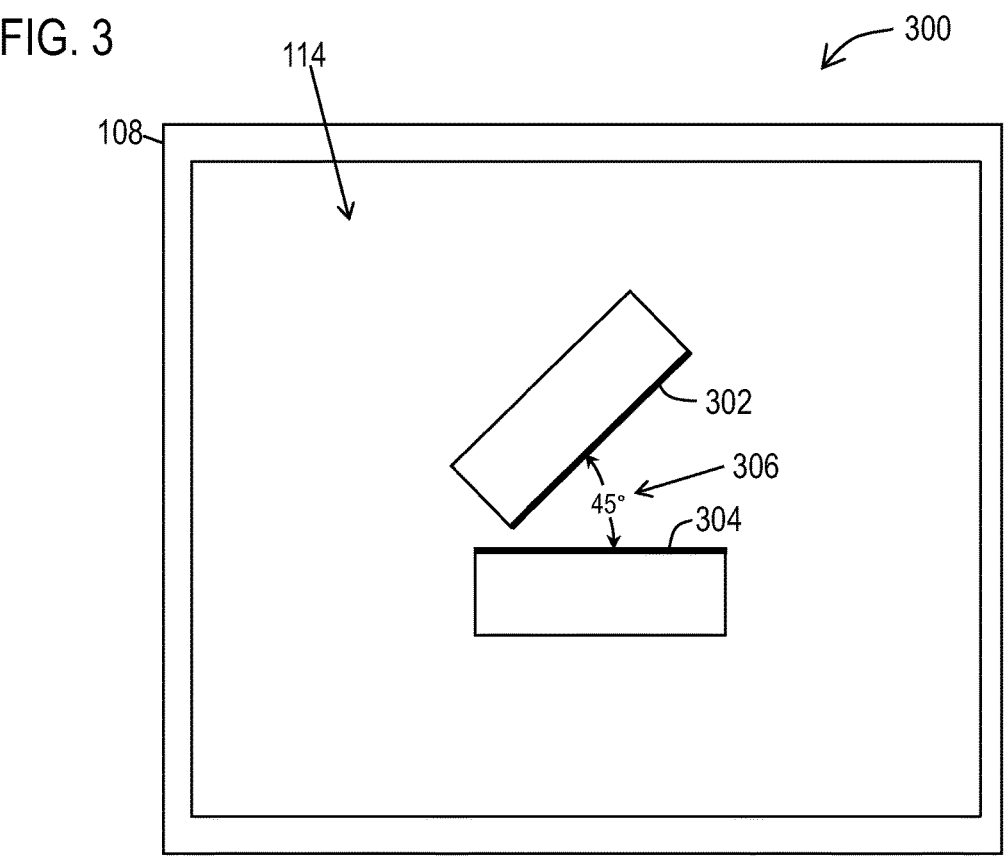

In an example embodiment, the processor may be configured to determine a relationship between two objects that are selected but are not connected together on the workspace and generate a preview type of annotation based on such a relationship. For example, as illustrated in the example workspace view 300 in FIG. 3, the processor may be configured to be responsive to selection inputs 118 to select a first object 302 and a second object 304 at the same time (which are unconnected). In response to such a selection of two objects that may be orientated at acute angles, the processor may be configured to determine an angular orientation relationship between the two selected objects and generate a preview type annotation 306 for both selected objects that visually displays the numeric angular dimension measurement (e.g., degrees) between the objects.

In other examples when two or more objects are selected, the processor may be configured to generate and display an annotation that depicts: the perpendicular distance between an arc center and a line; parallel distance between two parallel lines; distance between ellipse center and a circle center; or any other annotations that is relevant to the types and respective orientations of the multiple selected objects.

Figure 4:
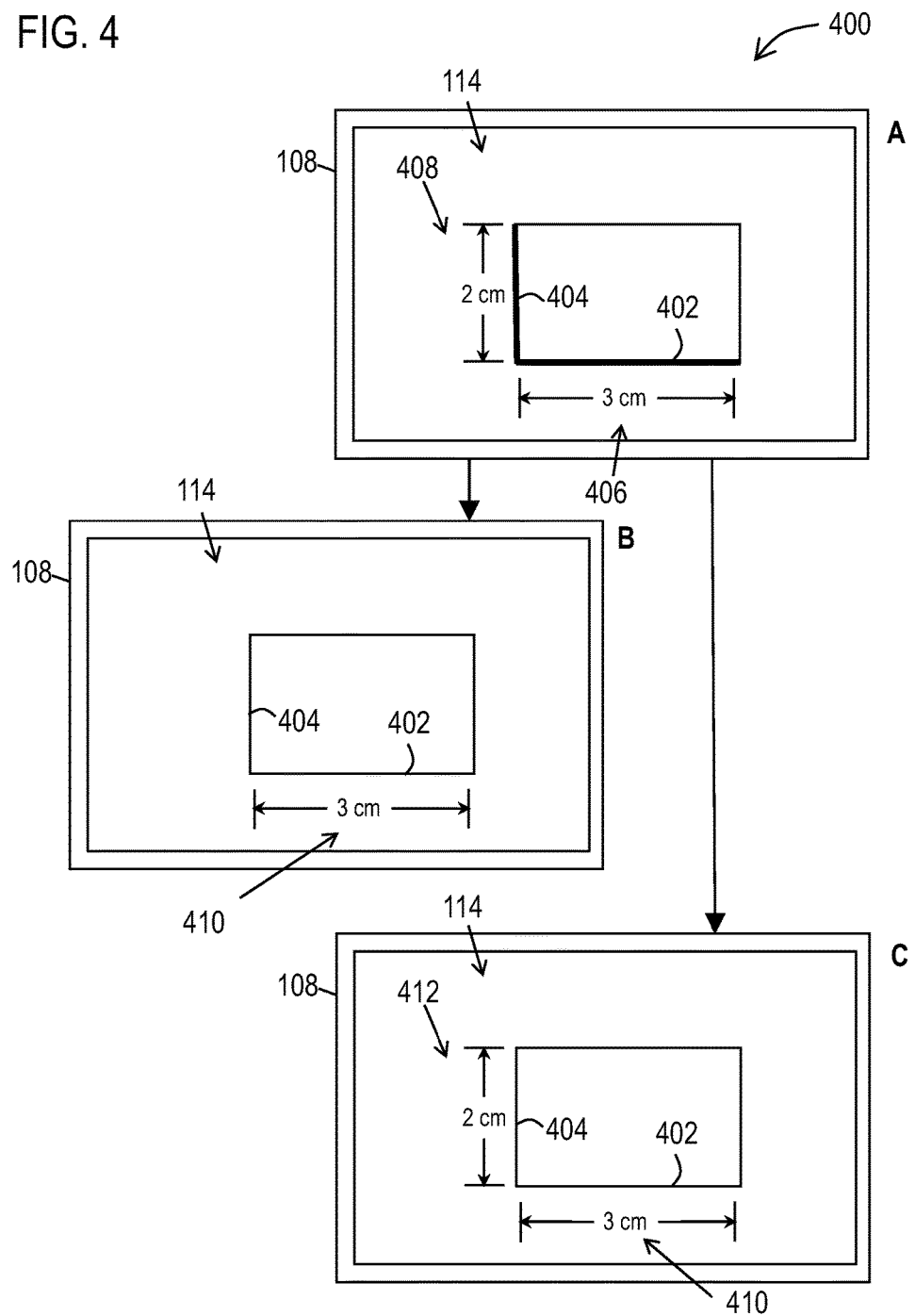

In addition, it should be appreciated that when multiple preview type annotations are displayed, the user may select one or more of the preview type annotation to be made persistent type annotations. For example, as illustrated in the example workspace 400 view A in FIG. 4, the processor may be responsive to two selection inputs for two objects 402, 404, to cause the display device 108 to display a preview type of a first annotation 406 at a first annotation location and a preview type of a second annotation 408 at a second annotation location on the visual workspace 400 adjacent the object location of the selected object 402. It should also be appreciated that three or more preview type annotations may be displayed as well.

If the user only provides a single annotation selection input for the first preview type annotation 406, then only the first annotation will change to the persistent type. As a result, as illustrated in the example workspace 400 in view B, when the previously described deselection input is received, the processor is configured to cause the display device to stop displaying the second preview annotation 408 on the workspace (which was not changed to a persistent type of annotation), while the first annotation 406 becomes the persistent type of annotation 410.

However, if the user desires both preview type annotations to become persistent, the user may provide annotation selection inputs for both preview type annotations 406, 408 which cause both of these preview type annotations to change to the persistent type. As a result, as illustrated in the example workspace 400 in view C, when the previously described deselection input is received, the processor is configured to cause the display device to display first and the second persistent type annotations 410, 412 on the workspace for the selected preview type annotations 406, 408.

Further, it should be appreciated that three or more preview annotations for a selected object may be displayed and selected to produce three or more persistent type annotations for the selected object. In addition, it should be appreciated that the persistent type of annotation may or may not be an exact duplicate of the preview type annotation. For example, in one embodiment, the preview type of an annotation may include a length dimension without tick lines and/or arrows, but the corresponding persistent type annotation may include the tick lines and/or arrows.

Further, it should be appreciated that the application software component may be capable of generating more preview type annotations than may be displayed by the application software component for one or more selected objects. The example application software component may be operative to determine which subset of a larger possible set of candidate preview type annotations to display based on characteristic associated with the objects displayed on the workspace and/or any other criteria determinable by the application software component.

For example, which preview annotations to display may be based on the user role using the application software component, the active mode/state of the application, and/or user configurations/preferences regarding types and styles of annotations to display. Also, different preview annotations and/or the positions of the preview annotations may vary depending on the availability of locations on the workspace to place annotations, whether the user is drawing on top of an image or not, drafting standards for which the user selects to have the annotations conform, and/or any other state and/or configuration of the application software component and the work product being generated by the component.

Also for example with respect to an angular annotation 204, the dimension line arrowheads of the annotation and the numeric number of degrees may be displayed on the outside of the lines that form the object for an acute angle, whereas for an obtuse angle, there may be sufficient room inside the object to place the dimension lines and numerical number of degrees. Also, for a circle type of object 216 (such as shown in FIG. 2), a generated preview type annotation 218 may correspond to a numerical value for the diameter and a single dimension line with an arrowhead that points to the selected object 216.

In addition for a vertical line segment, a preview annotation for a height dimension measurement may be displayed, but not a width dimension measurement. Whereas for a horizontal line segment, a preview annotation for a width dimension measurement may be displayed, but not a height dimension measurement. Whereas for a line segment at a 45 degree angle, preview annotations for both height and width dimension measurements may be displayed.

Thus, an example application software component may be operative to determine which annotation to display for a selected object (or more than one selected object) based on the type, orientation, physical characteristics, location, and other characteristics of the selected object(s) in order to display the most relevant annotations that have a high probability of being selected and being useful to the user creating the drawing.

In addition, the application software component may be operative to generate and display annotations in a manner that optimizes the appearance of the annotation. For example, the application software component may generate and display annotations: to avoid overlapping an annotation with a selected object or another annotation; and to ensure that the annotation is orientated and sized so as to be readable.

In example embodiments, a user may add and/or remove annotations in a similar manner in which they are added. For example by selecting an object that already has one first persistent type of annotation, the processor may be configured to display other available preview annotations. By selecting another preview annotation, it may change to a second persistent type of annotation that will remain visible when the object is deselected. Further, to remove a persistent annotation, the associated object may be selected (via an object selection input) and any persistent annotation can be changed back to the preview type by providing a selection input for the persistent annotation.

In a further embodiment, persistent annotations may be selectable via an annotation selection input in order to change visual aspects of the annotation. For example, rather than immediately changing to the preview type of annotation when a persistent type annotation is selected via an annotation selection input, the persistent type of annotation may first toggle to a different visual appearance. If the annotation has several different visual appearances, another annotation selection input may cause the persistent annotation to change to the next available visual appearance. When all available visual appearances for an annotation have been displayed, in this example, the next annotation selection input may cause the persistent type of annotation to change back to the preview type annotation.

For example, an angular orientation dimension for a triangle may include a first view that has the dimension lines and numeric measurement value of the annotation outside the triangle, and a second view that has the dimension lines and numeric measurement value of the annotation inside the triangle. In other examples, different styles of dimension lines, arrowheads, tick lines, numeric units, and numeric values may be displayed for the different selectable views of a persistent type annotation.

However, it should be appreciated that other example embodiments may use other processes to toggle between persistent type and preview type, and alternative views of an annotation. For example, once an annotation is a persistent type, the processor may be configured to enable the annotation to be changed to a preview type or an alternative view by merely providing an annotation selection input, without first selecting the object with an object selection input. In addition, to change an annotation from a persistent type to a preview type, when the annotation selection input is received, the processor may cause indicia such as an X or a trash can icon to be displayed adjacent the annotation, which can be selected via a further input to change the annotation to a preview type (which may immediately remove the annotation from the display if the object is not selected).

In addition, in further embodiments, the processor may be configured to enable the preview and/or persistent annotations to be movable relative to the associated object. For example by providing a dragging input (via a finger, stylus, or mouse pointer, or other type of input/input device), the processor may cause the annotation to move to positions on the workspace based on where the dragging input moves on the workspace.

In addition, an annotation may be changeable by providing annotation selection inputs for portions of the annotation. For example, by providing an annotation selection input on the numeric dimension measurement value (or the units thereof), the processor may be configured to toggle between different units of measurement (such as between mm, cm, inches) and/or may add/remove the units from the annotation.

In further embodiments, by providing an annotation selection input on the numeric dimension measurement value, the numeric value may be editable to a new value. Once the new value has been inputted via further inputs to an input device such as a physical or virtual keyboard, in this example, the application software component may be operative to automatically change the shape of the object to correspond to the updated numeric dimension measurement value. In other words, if the numeric value for an annotation dimension of a height for a rectangular object is changed from 4 cm to 5 cm, the processor may be configured to increase the height of the object on the workspace by a corresponding amount.

In addition to generating preview annotations in the form of dimensional measurements for drawing objects, the examples and processes described herein may also be adapted for use with generating other types of preview annotations for displayed objects. For example for an area of an object defined by an enclosed curve loop, the software application component 104 may generate one or more selectable preview type annotations having labels showing calculated metadata for the loop such as: an area, a centroid, moments of area, and/or any other information that can be determinable regarding an area. In another example, for a mass of a solid body, the software application component 104 may generate one or more selectable preview type annotations having labels showing calculated metadata for the solid body such as: mass, center of mass, moments of inertial, density, and/or any other information that can be determinable regarding a mass of a solid body.

In addition, for an application software component that is part of a CAD system (or other type of drawing system) the application software component may be operative to generate preview type annotations regarding properties of the particular parts being drawn/displayed. For example for a CAD drawing, a software application component of the CAD system may generate one or more selectable preview type annotations having labels showing metadata for a selected part, such as: owning user, release status, supplier, materials, and/or any other metadata that can be determined regarding the part.

Also, in addition to drawing objects or parts, a workspace may visually depict other types of objects such as embedded documents and/or images for which it may be desirable to display preview type annotations. For example, for a visual representation of a selected embedded PDF document, the software application component 104 may generate one or more selectable preview type annotations having labels showing metadata for the PDF document. Such metadata may include: owning user, number of pages, file size, author, and/or any other information determinable about the PDF document.

Also for a visual representation of an embedded image, a software application component may generate one or more selectable preview type annotations having labels showing metadata for the image, such as: location that the image was taken, device used to take the image, aspect ratio of the image, file size of the image, and/or any other information determinable about the image.

In addition, it should be understood that the previously described preview type annotations that depict measurements (e.g., width and height dimensions) may also be displayed for a selected image displayed in a workspace. Corresponding persistent type annotations may also have the previously described capability to dynamically update the displayed measurement values as the image is being manipulated. Thus, as a user changes a size of the image, the persistent annotations may dynamically update to illustrate the current size dimensions of the image.

In addition, in further example embodiments, preview type annotations may correspond to further objects having a type, shape, size, and/or orientation based on that of the selected object. For example, when a circle shape is selected, a preview type annotation may be displayed that corresponds to a related object having a similar size to a circle (e.g. a pentagon, hexagon, septagon, octagon). Selecting such a preview type of annotation may place a persistent object on the workspace that corresponds to the object that was depicted in the preview type annotation. Such a persistent object may then be manipulated (e.g., moved, resized, rotated, flipped) in the same manner as the original object. Further, when such a persistent type of object (generated from a selected preview type annotation) is itself selected, preview type annotations may be displayed for it as well.

In another example, a preview type annotation may correspond to a geometric translation of a selected object (e.g., mirrored, rotated, and/or flipped). For example, when the selected object is adjacent a mirror line on the workspace, the processor may be configured to generate a preview type annotation on the opposite side of the mirror line, which corresponds to a mirror image of the selected object. Such a mirror image preview type of annotation may be selected which causes the processor to place a persistent object in place of the preview type annotation that is the mirror image of the originally selected object and that is spaced apart from the mirror line with the same spacing as the originally selected object.

In another example, a preview type annotation may correspond to an offset curve of the selected object, which can be selected to generate an offset object adjacent to the originally selected object. For a straight and/or curved line segment type of object, such a preview type of annotation may correspond to an adjacent straight and/or curved line that follows a path parallel to the originally selected object. For more complex geometric shapes (e.g. a circle), such a preview type of annotation may correspond to an offset curve having a shape (e.g. larger or smaller circle) that is positioned around or inside the originally selected object (e.g. concentric).

It should be appreciated that the described examples may correspond to implementations of an overall embodiment in which the processor in configured to generate one or more preview annotations based at least in part on any set of metadata (dimension, material, size, date, author), offset, reflection, and/or other mathematical variation of the selected object, which can be made persistent on the workspace by selecting the preview type of annotation with a finger/stylus tap, mouse click, or other input representative of a selection of one of the preview type annotations.

Figure 5:
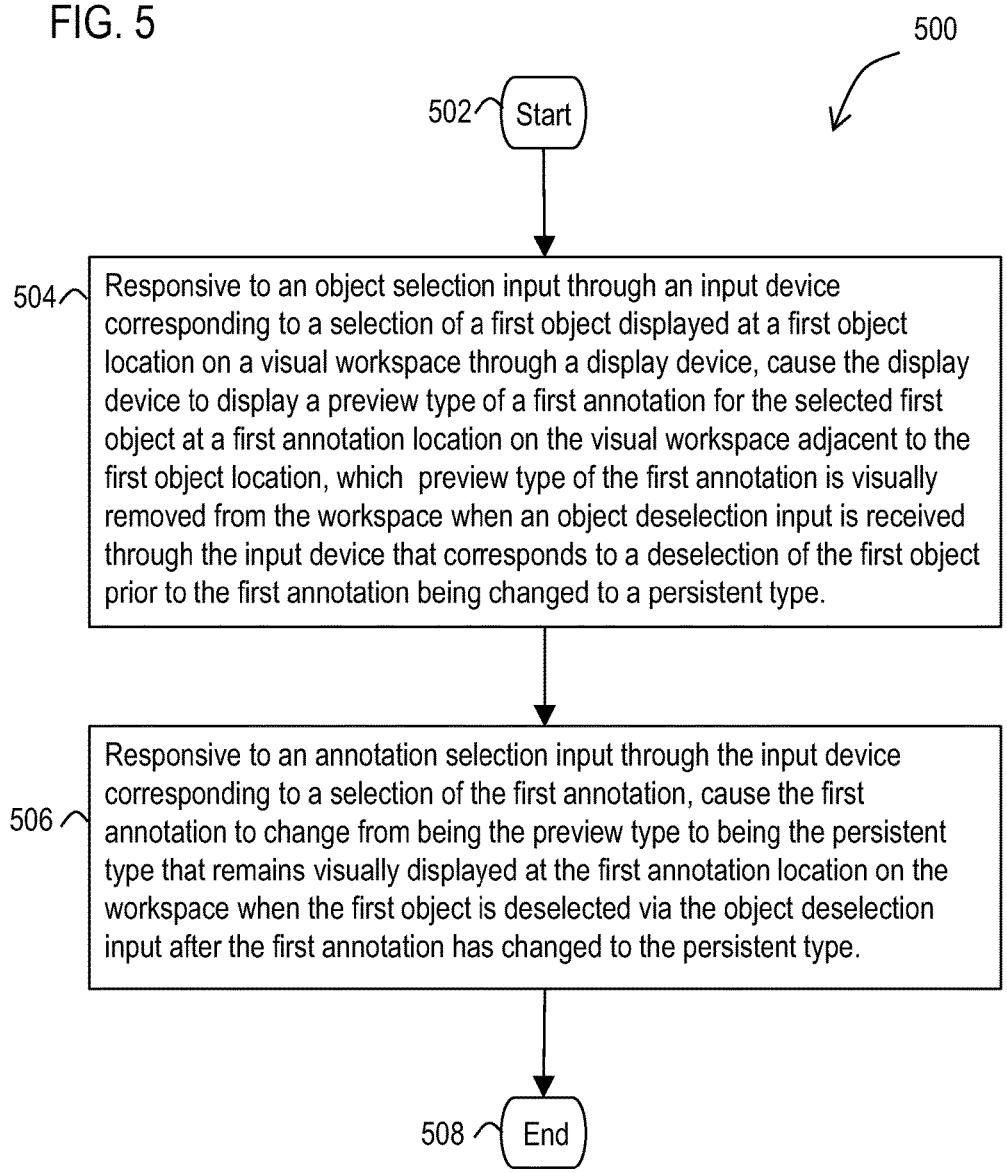
FIG. 5 illustrates a flow diagram of example methodologies that facilitate annotation of drawing objects.

With reference now to FIG. 5, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 5, a methodology 500 that facilitates annotation of drawing objects is illustrated. The method may start at 502 and at 504 the methodology may include the act of through operation of the at least one processor, responsive to an object selection input through an input device corresponding to a selection of a first object displayed at a first object location on a visual workspace through a display device, causing the display device to display a preview type of a first annotation for the selected first object at a first annotation location on the visual workspace adjacent to the first object location, which preview type of the first annotation is visually removed from the workspace when an object deselection input is received through the input device that corresponds to a deselection of the first object prior to the first annotation being changed to a persistent type.

In addition, the methodology 500 may include the act 506 of through operation of the at least one processor, responsive to an annotation selection input through the input device corresponding to a selection of the first annotation, causing the first annotation to change from being the preview type to being the persistent type that remains visually displayed at the first annotation location on the workspace when the first object is deselected via the object deselection input after the first annotation has changed to the persistent type. At 508 the methodology may end.

In addition, the methodology 500 may include other acts and features discussed previously with respect to the system 100. For example, as discussed previously the methodology may include storing in a memory an association between the first object and the first annotation responsive to the annotation selection input. Based on the association, the methodology may include automatically updating the first annotation to display modified information corresponding to changes to the first object being displayed on the workspace made in response to at least one further input through the input device.

Examples of the methodology may further comprise the act of determining at least one characteristic of the first object. As discussed previously the at least one characteristic may include: a type of the first object, a shape of the first object, a size of the first object, a relationship of the first object with respect to other objects in the workspace, or any combination thereof. The visual appearance of the first annotation that is caused to be displayed may be based at least in part on the determined at least one characteristic of the selected first object.

For example, the first object may have a shape and/or type corresponding to a rectangle. Thus, based on this shape or type of object, the methodology may include causing the first annotation to visually display a length dimension measurement of the rectangle, a width dimension measurement of the rectangle, a height dimension measurement of the rectangle, or any combination thereof. Also for example, the first object may have a shape and/or type corresponding to an arc. Thus, based on this shape or type of object, the methodology may include causing the first annotation to visually display a radius dimension measurement of the arc.

Also, in example embodiments, the methodology may include receiving a further input through the input device corresponding to a selection of the first annotation. Responsive to this selection, the methodology may include causing the display device to change visual features of the dimension lines of the first annotation.

Further, example embodiments of the methodology may include causing the display device to display a preview type of a second annotation (or more annotations) for the selected first object at a second annotation location (or more locations) in the visual workspace adjacent the first object location responsive to the object selection input. Responsive to respective annotation selection inputs for each of the first and second preview type annotations (or more preview type annotation) while the first object is selected, the methodology may include changing each of the first and second preview type annotations (or more preview type annotations) to persistent type annotations.

In addition, the example methodology may include, responsive to at least one further object selection input through the input device corresponding to a selection of both the first object and a second object displayed at a second object location on the visual workspace, causing the display device to display a preview type of a second annotation for the combination of the selected first and second objects at a second annotation location on the visual workspace adjacent to the first and second object locations. Also responsive to a further annotation selection input through the input device corresponding to a selection of the second annotation, the methodology may include causing the second annotation to change from being the preview type to being the persistent type that remains visually displayed at the second annotation location on the workspace when at least one of the first and second objects is deselected.

In another example, the methodology may include determining that the first object has a relationship with respect to the second object that corresponds to an angular orientation relationship. Based on the determined angular orientation relationship, the methodology may include causing the second annotation to visually display an angle dimension measurement between the first object and the second object.

As discussed previously, such acts associated with these methodologies may be carried out by one or more processors. Such processor(s) may be included in one or more data processing systems for example that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

Figure 6:
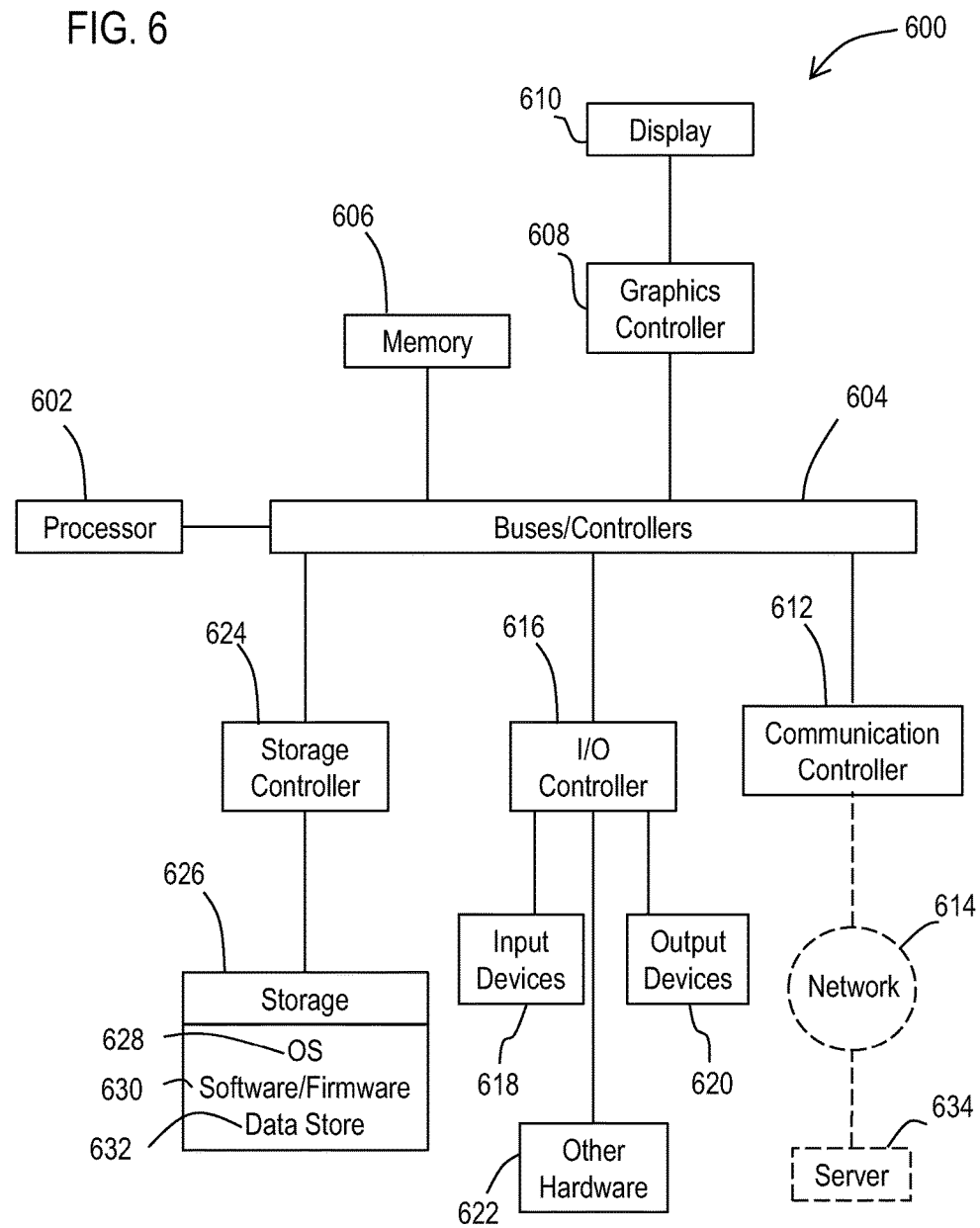
FIG. 6 illustrates a block diagram of a data processing system in which an embodiment can be implemented.

FIG. 6 illustrates a block diagram of a data processing system 600 (also referred to as a computer system) in which an embodiment can be implemented, for example as a portion of a PLM, CAD, and/or drawing system operatively configured by software or otherwise to perform the processes as described herein. The data processing system depicted includes at least one processor 602 (e.g., a CPU) that may be connected to one or more bridges/controllers/buses 604 (e.g., a north bridge, a south bridge). One of the buses 604 for example may include one or more I/O buses such as a PCI Express bus. Also connected to various buses in the depicted example may include a main memory 606 (RAM) and a graphics controller 608. The graphics controller 608 may be connected to one or more display devices 610. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 612 (Ethernet controllers, WiFi controllers, cellular controllers) operative to connect to a local area network (LAN), Wide Area Network (WAN), a cellular network, and/or other wired or wireless networks 614 or communication equipment.

Further components connected to various busses may include one or more I/O controllers 616 such as USB controllers, Bluetooth controllers, and/or dedicated audio controllers (connected to speakers and/or microphones). It should also be appreciated that various peripherals may be connected to the USB controller (via various USB ports) including input devices 618 (e.g., keyboard, mouse, touch screen, trackball, camera, microphone, scanners), output devices 620 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 622 connected to the I/O controllers 616 may include any type of device, machine, or component that is configured to communicate with a data processing system.

Additional components connected to various busses may include one or more storage controllers 624 (e.g., SATA). A storage controller may be connected to a storage device 626 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 604 such as a PCI Express bus.

A data processing system in accordance with an embodiment of the present disclosure may include an operating system 628, software/firmware 630, and data stores 632 (that may be stored on a storage device 626). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 612 may be connected to the network 614 (not a part of data processing system 600), which can be any public or private data processing system network or combination of networks, as known to those of skill in the art, including the Internet. Data processing system 600 can communicate over the network 614 with one or more other data processing systems such as a server 634 (also not part of the data processing system 600). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 602 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example the data processing system 600 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 600 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system comprising:
    at least one processor configured:
        to cause responsive to an object selection input through an input device corresponding to a selection of a first object displayed at a first object location on a visual workspace through a display device, the display device to contemporaneously display a preview type of a first annotation for the selected first object at a first annotation location and a preview type of second annotation for the selected first object at a second annotation location on the visual workspace adjacent to the first object location, which first and second annotations displayed as a preview type are individually selectable via inputs through the input device,
        to cause the display device to stop displaying the first annotation and/or the second annotation on the workspace when an object deselection input is received through the input device that corresponds to a deselection of the first object prior to the first annotation and/or the second annotation being changed respectively from the preview type to a persistent type, and
        while the first object is selected, to cause responsive to a first annotation selection input through the input device corresponding to a selection of the first annotation, the first annotation to change from being the preview type to being the persistent type that remains visually displayed at the first annotation location on the workspace when the first object is deselected via an object deselection input after the first annotation has changed to the persistent type, and
        while the first object continues to be selected and after the first annotation has changed to the persistent type, to cause responsive to a second annotation selection input that is different than the first annotation selection input through the input device corresponding to a selection of the second annotation, the second annotation to change from being the preview type to being the persistent type that remains visually displayed at the second annotation location on the workspace when the first object is deselected via the object deselection input after the first and second annotations have changed to the persistent type.

2. The system according to claim 1, wherein the at least one processor is configured to store in a memory an association between the first object and the first annotation responsive to the first annotation selection input, and based on the association to automatically update the first annotation to display modified information corresponding to changes to the first object being displayed on the workspace made in response to at least one further input through the input device.

3. The system according to claim 2, wherein the at least one processor is configured to determine at least one characteristic of the first object, wherein the at least one characteristic includes: a type of the first object, a shape of the first object, a size of the first object, a relationship of the first object with respect to other objects in the workspace, or any combination thereof, wherein the at least one processor is configured to cause the visual appearance of the first and second annotations to be displayed based at least in part on the determined at least one characteristic of the selected first object.

4. The system according to claim 3, wherein the first object has a shape corresponding to a rectangle, wherein the at least one processor is configured to cause the first annotation to visually display a length dimension measurement of the rectangle, a width dimension measurement of the rectangle, a height dimension measurement of the rectangle, or any combination thereof based on the rectangle shape of the first object.

5. The system according to claim 3, wherein the first object has a shape corresponding to an arc, wherein the at least one processor is configured to cause the first annotation to visually display a radius dimension measurement of the arc based on the arc shape of the first object.

6. The system according to claim 1, wherein the at least one processor is configured to receive a further input through the input device corresponding to a selection of the first annotation that causes the at least one processor to change visual features of dimension lines of the first annotation.

7. The system according to claim 1, wherein the first and second selection annotation inputs respectively correspond to mouse or touch screen selection input on each respective first and second annotation.

8. The system according to claim 1, wherein the at least one processor is configured to be responsive to at least one further object selection input through the input device corresponding to a selection of both the first object and a second object displayed at a further object location on the visual workspace, to cause the display device to display a preview type of a further annotation for the combination of the selected first and second objects at a further annotation location on the visual workspace adjacent to the first and second object locations, wherein the at least one processor is configured to be responsive to a further annotation selection input through the input device corresponding to a selection of the further annotation, to cause the further annotation to change from being the preview type to being the persistent type that remains visually displayed at the further annotation location on the workspace when at least one of the first and second objects is deselected.

9. The system according to claim 8, further comprising the at least one processor determining that the first object has a relationship with respect to the second object that corresponds to an angular orientation relationship, wherein the further annotation visually displays an angle dimension measurement between the first object and the second object based on the determined angular orientation relationship.

10. The system according to claim 1, further comprising a memory, an application software component, and a touch screen comprised of the input device and the display device, wherein the first and second annotations include dimensional measurements of the first object, wherein the application software component is comprised of instructions that when included in the memory and executed by the at least one processor, cause the at least one processor to control the display of the preview and persistent types of the first and second annotations on the touch screen responsive to the object and first and second annotation selection inputs received through a user touching the touch screen respectively at the first object location, the first annotation location, and the second annotation location of the workspace, wherein the application software component corresponds to a CAD software application that is operative to produce a CAD drawing based at least in part on the inputs through the touch screen.

11. A method comprising:
through operation of at least one processor:
responsive to an object selection input through an input device corresponding to a selection of a first object displayed at a first object location on a visual workspace through a display device, causing the display device to contemporaneously display a preview type of a first annotation for the selected first object at a first annotation location and a preview type of second annotation for the selected first object at a second annotation location on the visual workspace adjacent to the first object location, which preview type of the first annotation is visually removed from the workspace when an object deselection input is received through the input device that corresponds to a deselection of the first object prior to the first annotation being changed to a persistent type, which first and second annotations displayed as a preview type are individually selectable via inputs through the input device, and which first and/or second annotations are stopped being displayed on the workspace when an object deselection input is received through the input device that corresponds to a deselection of the first object prior to the first annotation and/or the second annotation being changed respectively from the preview type to a persistent type;
while the first object is selected causing responsive to a first annotation selection input through the input device corresponding to a selection of the first annotation, the first annotation to change from being the preview type to being the persistent type that remains visually displayed at the first annotation location on the workspace when the first object is deselected via the object deselection input after the first annotation has changed to the persistent type; and
while the first object continues to be selected and after the first annotation has changed to the persistent type, to cause responsive to a second annotation selection input that is different than the first annotation selection input through the input device corresponding to a selection of the second annotation, the second annotation to change from being the preview type to being the persistent type that remains visually displayed at the second annotation location on the workspace when the first object is deselected via the object deselection input after the first and second annotations have changed to the persistent type.

12. The method according to claim 11, further comprising:
through operation of the at least one processor, storing in a memory an association between the first object and the first annotation responsive to the first annotation selection input
through operation of at least one processor, based on the association automatically updating the first annotation to display modified information corresponding to changes to the first object being displayed on the workspace made in response to at least one further input through the input device.

13. The method according to claim 11, further comprising:

through operation of the at least one processor, determining at least one characteristic of the first object, wherein the at least one characteristic includes: a type of the first object, a shape of the first object, a size of the first object, a relationship of the first object with respect to other objects in the workspace, or any combination thereof,
wherein the visual appearance of the first and second annotations that is caused to be displayed is based at least in part on the determined at least one characteristic of the selected first object.

14. The method according to claim 13, wherein the first object has a shape corresponding to a rectangle, further comprising through operation of the at least one processor causing the first annotation to visually display a length dimension measurement of the rectangle, a width dimension measurement of the rectangle, a height dimension measurement of the rectangle, or any combination thereof based on the rectangle shape of the first object.

15. The method according to claim 13, wherein the first object has a shape corresponding to an arc, further comprising through operation of the at least one processor causing the first annotation to visually display a radius dimension measurement of the arc based on arc shape of the first object.

16. The method according to claim 11, further comprising:
through operation of the at least one processor, receiving a further input through the input device corresponding to a selection of the first annotation,
through operation of the at least one processor responsive to the selection of the first annotation, causing the display device to change visual features of dimension lines of the first annotation.

17. The method according to claim 11, wherein the first and second selection annotation inputs correspond to mouse or touch screen selection inputs on each respective first and second annotation.

18. The method according to claim 11, further comprising:
through operation of the at least one processor, responsive to at least one further object selection input through the input device corresponding to a selection of both the first object and a second object displayed at a second object location on the visual workspace, causing the display device to display a preview type of a further annotation for the combination of the selected first and second objects at a further annotation location on the visual workspace adjacent to the first and second object locations,
through operation of the at least one processor, responsive to a further annotation selection input through the input device corresponding to a selection of the further annotation, causing the further annotation to change from being the preview type to being the persistent type that remains visually displayed at the further annotation location on the workspace when at least one of the first and second objects is deselected.

19. The method according to claim 18, further comprising:
through operation of the at least one processor, determining that the first object has a relationship with respect to the second object that corresponds to an angular orientation relationship,
through operation of the at least one processor, causing the further annotation to visually display an angle dimension measurement between the first object and the second object based on the determined angular orientation relationship.

20. A non-transitory computer readable medium encoded with executable instructions that when executed, cause at least one processor to carry out a method comprising:

responsive to an object selection input through an input device corresponding to a selection of a first object displayed at a first object location on a visual workspace through a display device, causing the display device to contemporaneously display a preview type of a first annotation for the selected first object at a first annotation location and a preview type of second annotation for the selected first object at a second annotation location on the visual workspace adjacent to the first object location, which preview type of the first annotation is visually removed from the workspace when an object deselection input is received through the input device that corresponds to a deselection of the first object prior to the first annotation being changed to a persistent type, which first and second annotations displayed as a preview type are individually selectable via inputs through the input device, and which first and/or second annotations are stopped being displayed on the workspace when an object deselection input is received through the input device that corresponds to a deselection of the first object prior to the first annotation and/or the second annotation being changed respectively from the preview type to a persistent type;

while the first object is selected, causing responsive to a first annotation selection input through the input device corresponding to a selection of the first annotation, the first annotation to change from being the preview type to being the persistent type that remains visually displayed at the first annotation location on the workspace when the first object is deselected via the object deselection input after the first annotation has changed to the persistent type; and while the first object continues to be selected and after the first annotation has changed to the persistent type, to cause responsive to a second annotation selection input that is different than the first annotation selection input through the input device corresponding to a selection of the second annotation, the second annotation to change from being the preview type to being the persistent type that remains visually displayed at the second annotation location on the workspace when the first object is deselected via the object deselection input after the first and second annotations have changed to the persistent type.

* * * * *